United States Patent
Aaron

(10) Patent No.: US 7,747,774 B2
(45) Date of Patent: Jun. 29, 2010

(54) METHODS, SYSTEMS AND COMPUTER PROGRAM PRODUCTS FOR OBSCURING TRAFFIC IN A DISTRIBUTED SYSTEM

(75) Inventor: Jeffrey A. Aaron, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1280 days.

(21) Appl. No.: 10/970,630

(22) Filed: Oct. 21, 2004

(65) Prior Publication Data

US 2006/0041653 A1 Feb. 23, 2006

Related U.S. Application Data

(63) Continuation-in-part of application No. 10/924,072, filed on Aug. 23, 2004.

(51) Int. Cl.
G06F 15/173 (2006.01)
(52) U.S. Cl. .................................................. 709/238
(58) Field of Classification Search ................. 709/203, 709/225, 238, 243; 713/150
See application file for complete search history.

(56) References Cited

U.S. PATENT DOCUMENTS

| | | | | |
|---|---|---|---|---|
| 5,086,467 A * | 2/1992 | Malek | | 380/252 |
| 5,177,788 A * | 1/1993 | Schanning et al. | | 713/162 |
| 5,303,303 A * | 4/1994 | White | | 713/160 |
| 5,535,334 A * | 7/1996 | Merkley et al. | | 709/239 |
| 6,907,473 B2 * | 6/2005 | Schmidt et al. | | 709/248 |
| 6,917,974 B1 * | 7/2005 | Stytz et al. | | 709/225 |
| 6,986,036 B2 * | 1/2006 | Wang et al. | | 713/153 |
| 7,010,604 B1 * | 3/2006 | Munger et al. | | 709/227 |
| 7,412,608 B2 * | 8/2008 | May | | 713/194 |
| 7,418,504 B2 * | 8/2008 | Larson et al. | | 709/226 |
| 2002/0078384 A1 * | 6/2002 | Hippelainen | | 713/201 |
| 2002/0169706 A1 * | 11/2002 | Chandra et al. | | 705/37 |
| 2004/0003116 A1 * | 1/2004 | Munger et al. | | 709/245 |
| 2004/0255126 A1 * | 12/2004 | Reith | | 713/183 |
| 2005/0172120 A1 * | 8/2005 | Wang et al. | | 713/160 |
| 2006/0041653 A1 * | 2/2006 | Aaron | | 709/223 |
| 2006/0069912 A1 * | 3/2006 | Zheng et al. | | 713/151 |
| 2006/0123134 A1 * | 6/2006 | Munger et al. | | 709/245 |
| 2008/0040792 A1 * | 2/2008 | Larson et al. | | 726/14 |

OTHER PUBLICATIONS

"Heterogeneous Sensor Networks", Intel Technology Journal, 2003. (website: www.intel.com/research/exploratory/hetergenoeous/.htm).

Butler, Jim, "Mobile robots as gateways into wireless sensor networks", LinuxDevices.com, May 2, 2003.

Green, Heather, "Tech Wave 2: The Sensor Revolution", BusinessWeek Online, Aug. 25, 2003.

* cited by examiner

Primary Examiner—J Bret Dennison
(74) Attorney, Agent, or Firm—Myers Bigel Sibley & Sajovec

(57) ABSTRACT

Methods for obscuring real traffic in a distributed network are provided. In particular, obscuring traffic associated with ones of a plurality of components is generated on the distributed network. The generated obscuring traffic is transmitted to the ones of the plurality of components so as to obscure the real traffic from intruders of the distributed network. Related systems and computer program products are also provided.

26 Claims, 3 Drawing Sheets

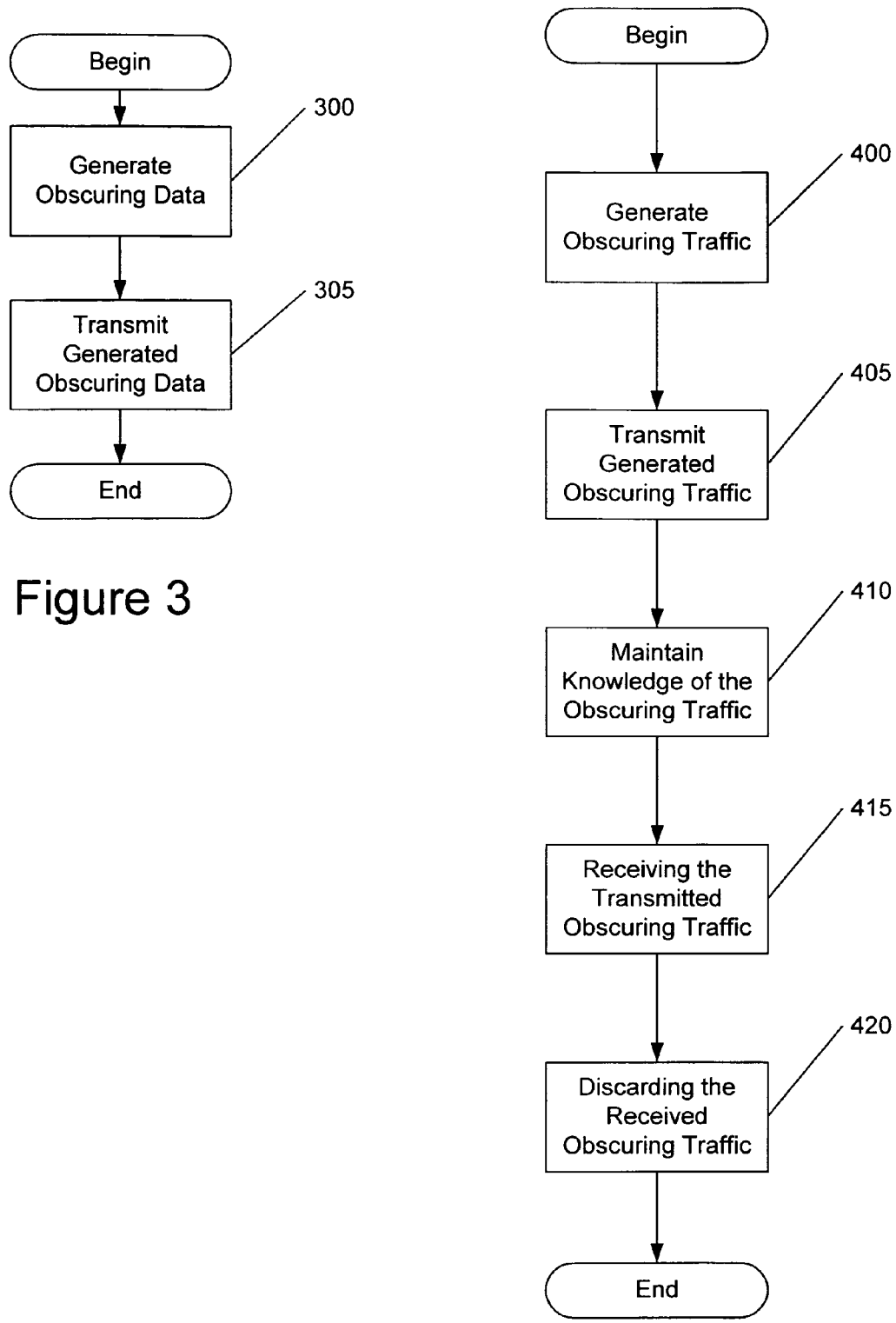

US 7,747,774 B2

METHODS, SYSTEMS AND COMPUTER PROGRAM PRODUCTS FOR OBSCURING TRAFFIC IN A DISTRIBUTED SYSTEM

RELATED APPLICATION

This application is a continuation-in-part of U.S. patent application Ser. No. 10/924,072 entitled "METHODS, SYSTEMS AND COMPUTER PROGRAM PRODUCTS FOR PROVIDING APPLICATION SERVICES TO A USER," filed Aug. 23, 2004, which is incorporated herein by reference as if set forth in its entirety.

FIELD OF THE INVENTION

This invention relates to methods, systems and computer program products for devices in a distributed system and, more particularly, to methods, systems and computer program products for providing security in a distributed system.

BACKGROUND OF THE INVENTION

Computing devices are used for providing a wide variety of applications support to users. As used herein, the term "computing device" refers to any equipment with computational capability or that is integrated with equipment with computational ability. Accordingly, as used herein, computing device can include one or more enterprise, application, personal, pervasive and/or embedded computer systems that perform computational operations and associated input and/or output devices or components thereof. Examples of computing devices, as used herein, include computer workstations, personal digital assistants, cell phones, email pagers, automobile navigation systems, and computer-controlled appliances.

As computing devices and application programs for the same evolve, along with networks interconnecting such devices, the range of customer (user) services that can be provided by computing devices is becoming increasingly complex. As a result, the range of personal information transmitted through these distributed networks is expanding and the potential consequences of misuse and/or exploitation of the associated applications or services may be greater, therefore, increasing the importance of security within these networks. Existing methods of securing communications through a distributed network, for example, authentication, encryption, message integrity and the like, may not provide the level of security desired by users of a distributed network. For example, if messages sent between components in a distributed system are encrypted, anyone with the encryption key may access the content of these messages. Thus, if an intruder "hacks" deep enough into the system to obtain the encryption key, the intruder may eavesdrop and gain access to private communications. Accordingly, improved methods of securing messages between components in a distributed network may be desired. Furthermore, an intruder may utilize information contained in the messages, as well as the mere frequency and pattern of messages (encrypted or not), to enable and/or refine attack, improved methods of increasing the difficultly of exploiting such message information may also be desired.

SUMMARY OF THE INVENTION

Some embodiments of the present invention provide methods for obscuring real traffic in a distributed network. In particular, obscuring traffic associated with ones of a plurality of components is generated on the distributed network. The generated obscuring traffic is transmitted to the ones of the plurality of components so as to obscure the real traffic from intruders of the distributed network.

In further embodiments of the present invention, knowledge of the obscuring traffic may be maintained so as to allow differentiation between the generated obscuring traffic and the real traffic in the distributed network. Update messages may be transmitted to the plurality of components so as to allow the components to distinguish between the generated obscuring traffic and the real traffic. In certain embodiments of the present invention, a first update message may be transmitted for a first time period and a second update message may be transmitted for a second time period before expiration of the first time period.

In still further embodiments of the present invention, the transmitted obscuring traffic may be received at the ones of the plurality of components. The received obscuring traffic may be discarded at the ones of the plurality of components.

In some embodiments of the present invention, the obscuring traffic may be generated by randomly generating dummy traffic for the ones of the plurality of components. In these embodiments of the present invention, the generated dummy traffic may be transmitted to the plurality of components. In certain embodiments of the present invention, the randomly generated dummy traffic may be generated using pseudo-random codes (PRCs), which are sometimes referred to as pseudo-random number (PRN) codes. The dummy traffic may include a plurality of dummy packets and each of the dummy packets may be generated using a sequence formed from a start position and data field length in the PRC that identifies a dummy message for the dummy packet and a start position and data field length in the PRC that identifies a time to release the dummy message, as well as a scheme for sequencing/interleaving the message and time data fields in the same or separate PRCs. It will be understood that a different random-appearing sequence may be formed via each set of different PRC and/or different start position.

In further embodiments of the present invention, a list of messages may be generated to be included in dummy packets. The dummy packets may be transmitted including messages from the list. Update messages may be generated including a message identifier referring to a message in the list of messages, a source identifier, a destination identifier and a transmit time for the associated dummy packet. The obscuring traffic may be generated using a script or sequencing method that utilizes the message identifier, the source identifier and the transmit time.

In further embodiments of the present invention, a list of messages may be generated to be included in dummy packets. The dummy packets may be transmitted including messages from the list. The dummy packets may include a message identifier referring to a message in the list of data, a source identifier, a destination identifier and a transmit time for the associated dummy packet.

In still further embodiments of the present invention, a dummy packet including data from a previously transmitted real packet may be generated. The dummy packet including the data from the previously transmitted real packet may be transmitted to the plurality of components.

In some embodiments of the present invention, the obscuring traffic may be generated using a mathematical algorithm. In certain embodiments of the present invention, an amount of generated obscuring traffic may be increased or decreased responsive to a perceived threat to the distributed network.

Different obscuring traffic may be generated for each of the ones of a plurality of components coupled to the distributed network.

While described above primarily with reference to method aspects, it will be understood that the present invention further includes system and computer program product aspects.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIGS. 3-4 are flowcharts illustrating operations according to some embodiments of the present invention.

DETAILED DESCRIPTION OF EMBODIMENTS OF THE PRESENT INVENTION

Figure 1:
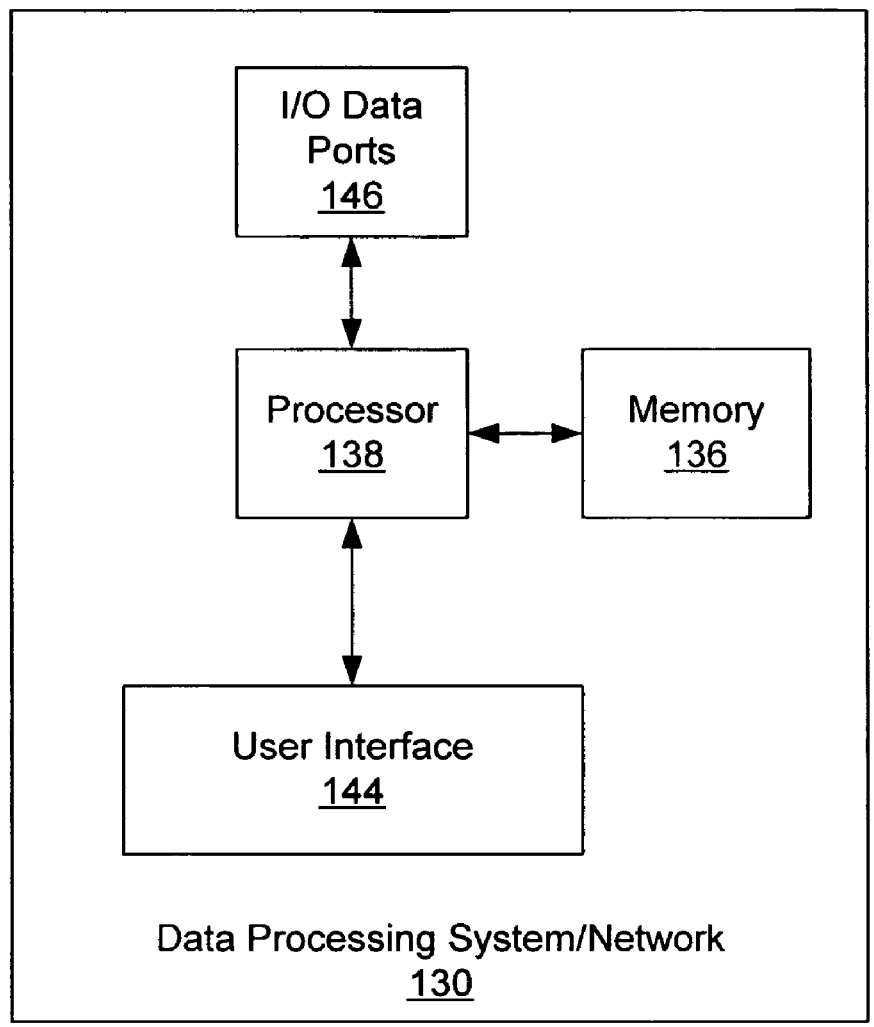
FIG. 1 is a block diagram of a data processing system suitable for use in some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Finally, it will be understood that, although the terms first, second, etc. may be used herein to describe various elements, these elements should not be limited by these terms. These terms are only used to distinguish one element from another. For example, a first portion could be termed a second portion, and, similarly, a second portion could be termed a first portion without departing from the teachings of the disclosure.

Embodiments of the present invention will now be discussed with respect to FIGS. 1 through 4. As discussed herein, obscuring traffic may be generated and introduced into a distributed network in an organized fashion. The presence of the obscuring traffic in the distributed network may obscure the real traffic from an intruder trying to hack into the system. Thus, the intruder may have to use considerable additional processing to determine which messages are "true messages" and which messages are "obscuring messages," thus, making it more difficult for the intruder to figure out what is actually being communicated between components of the distributed system, and subsequently to understand the operations of the distributed system so as to be able to better attack/exploit the system. Accordingly, the presence of the obscuring traffic may provide an added measure of security to the distributed system as discussed further herein.

FIG. 1 illustrates an exemplary embodiment of a computing device or data processing system 130 configured in accordance with embodiments of the present invention. The data processing system 130, which may be incorporated in, for example, a personal computer, a PDA, a wireless terminal/phone, a smart appliance or the like, may include a user interface 144, including, for example, input device(s) such as a keyboard or keypad, a display, a speaker and/or microphone, and a memory 136 that communicate with a processor 138. The data processing system 130 may further include an I/O data port(s) 146 that also communicates with the processor 138. The I/O data ports 146 can be used to transfer information between the data processing system 130 and another computer system or a network using, for example, an Internet Protocol (IP) connection. These components may be conventional components such as those used in many conventional data processing systems, which may be configured to operate as described herein.

Figure 2:
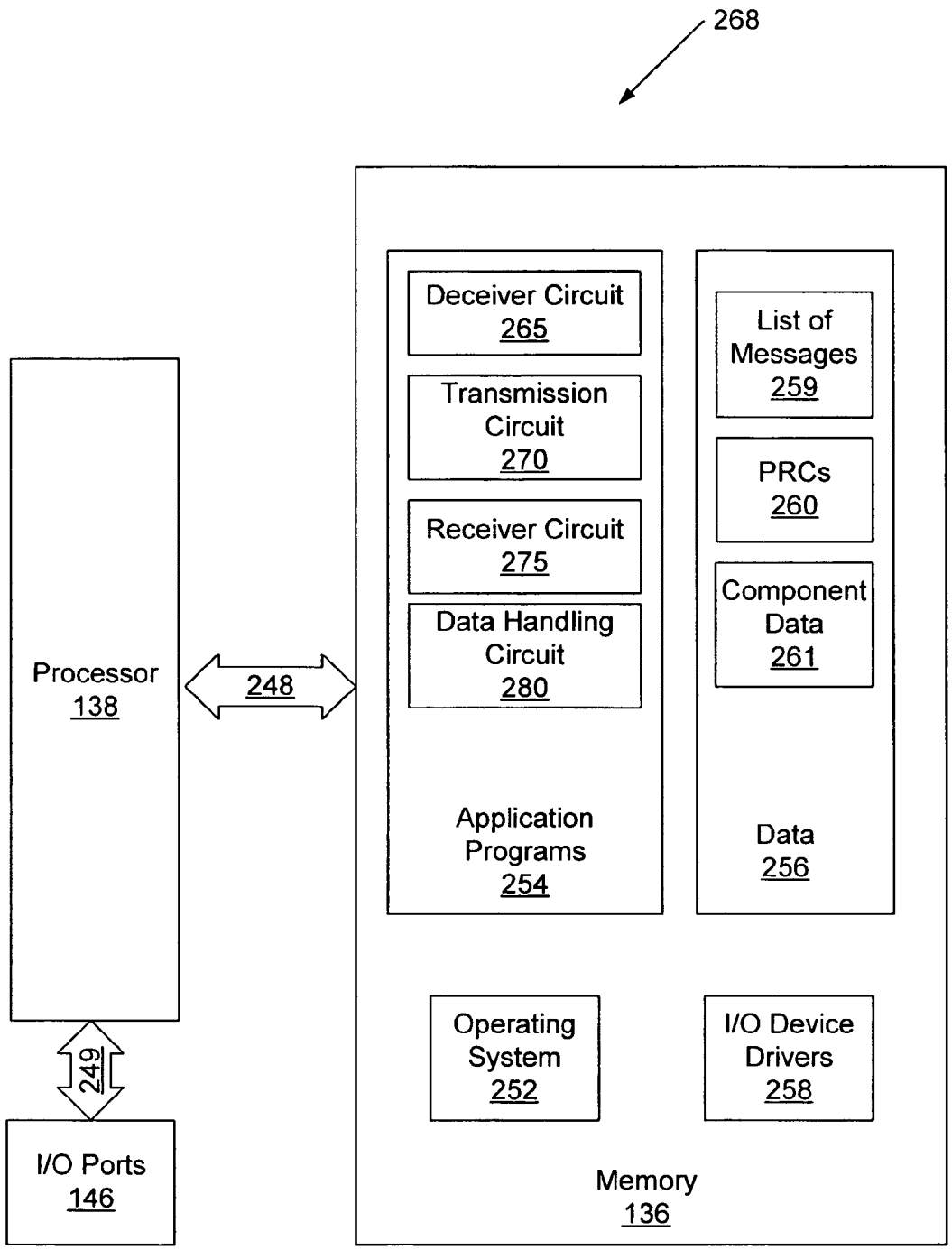
FIG. 2 is a block diagram of a system for obscuring real traffic in a distributed network according to some embodiments of the present invention.

Referring now to FIG. 2, a block diagram of a system 268 for obscuring real traffic in a distributed network is provided that illustrates systems, methods, and computer program products in accordance with some embodiments of the present invention will now be discussed. It will be understood that systems, methods and computer program products according to embodiments of the present invention may be used in combination with the Automated Service-Providing Integrated Commonality (ASPIC) framework discussed in commonly assigned U.S. patent application Ser. No. 10/924,072 entitled "METHODS, SYSTEMS AND COMPUTER PROGRAM PRODUCTS FOR PROVIDING APPLICATION SERVICES TO A USER," filed Aug. 23, 2004, which is incorporated herein by reference as if set forth in its entirety. Although embodiments of the present invention are discussed herein in combination with the ASPIC framework, embodiments of the present invention are not limited to this configuration. For example, embodiments of the present invention may be used in combination with any distributed network without departing from the scope of the present invention.

As illustrated in FIG. 2, the processor 138 communicates with the memory 136 via an address/data bus 248. The processor 138 can be any commercially available or custom enterprise, application, personal, pervasive and/or embedded microprocessor, microcontroller, digital signal processor or the like. The memory 136 may include any memory devices containing the software and data used to implement the functionality of the data processing system 130. The memory 136 can include, but is not limited to, the following types of devices: ROM, PROM, EPROM, EEPROM, flash memory, SRAM, and DRAM.

As further illustrated in FIG. 2, the memory 136 may include several categories of software and data used in the system 268: an operating system 252; application programs 254; input/output (I/O) device drivers 258; and data 256. As will be appreciated by those of skill in the art, the operating system 252 may be any operating system suitable for use with a data processing system, such as OS/2, AIX or zOS from International Business Machines Corporation, Armonk, N.Y., Windows95, Windows98, Windows2000 or WindowsXP, or Windows CE from Microsoft Corporation, Redmond, Wash., Palm OS, Symbian OS, Cisco IOS, VxWorks, Unix or Linux. The I/O device drivers 258 typically include software routines accessed through the operating system 252 by the application programs 254 to communicate with devices such as the I/O data port(s) 146 and certain memory 136 components. The application programs 254 are illustrative of the programs that implement the various features of the system 268 and preferably include at least one application that supports operations according to embodiments of the present invention. Finally, as illustrated the data 256 may include a list of messages 259, a list of pseudo-random codes 260 and component data 261, which may represent the static and dynamic data used by the application programs 254, the operating system 252, the I/O device drivers 258, and other software programs that may reside in the memory 136.

As further illustrated in FIG. 2, according to some embodiments of the present invention the application programs 254 include a deceiver circuit 265, a transmission circuit 270, a receiver circuit 275 and a data handling circuit 280. The deceiver circuit 265 may be configured to generate obscuring traffic associated with one or more components coupled to the distributed network. It will be understood that "components" according to embodiments of the present invention may include computing devices, servers, gateways, firewalls, load balancers, content switches, separate heterogeneous applications, instances of distributed applications, routers, other switches and the like. It will be further understood that the system 268 may be included in one or more of the components in the distributed network. Thus, for example, the deceiver circuit 265 may be included in each component in the distributed network or the deceiver circuit may be included in a single component configured to communicate with each of the other components coupled to the distributed network.

As used herein, "obscuring traffic" or "obscuring data" refers to generated data that may be used to obscure or hide the real traffic or data being communicated between the components of the distributed network. "Real traffic" or "real data" refers to true data that is being communicated between components of the distributed network, i.e., the data that the obscuring traffic is generated to hide from hackers/intruders of the distributed system.

For example, in some embodiments of the present invention, the deceiver circuit 265 may generate obscuring traffic by randomly generating dummy traffic for one or more of a plurality of components coupled to the distributed network. As used herein, "randomly generating" refers to truly random, pseudo-random and randomly appearing without departing from the scope of the present invention. For example, the deceiver circuit 265 may randomly generate dummy packets including dummy data and the dummy packets may be transmitted to one or more components in the system at random times. Thus, the content of the dummy packet and the time at which the dummy packet is transmitted may both be random, making it more difficult for an intruder to identify a pattern of dummy traffic, allowing the intruder to distinguish the obscuring traffic from the real traffic. Typically, the data in the dummy packets should appear as if it is real data, otherwise the dummy packets may be easily identifiable by intruders as containing nonsensical data. Accordingly, in some embodiments of the present invention, the dummy packets may be populated with previously transmitted true data so that the data not only appears real, it actually was at one time real traffic. In further embodiments of the present invention, the obscuring data may be generated using a mathematical algorithm. It will be understood that algorithms may include filtering rules or other means of preferentially obtaining realistic data as opposed to non-realistic data. Generation of data using mathematical algorithms is known to those having skill in the art and, therefore, will not be discussed further herein.

In some embodiments of the present invention, the deceiver circuit 265 may generate the obscuring traffic using pseudo-random codes (PRCs) 260. In other words, the PRCs may be used to populate the dummy packets. For example, a list of start positions in the PRC 260 may be sent to one or more of the components coupled to the distributed network. The list may include a start position in the PRC that identifies a dummy message for the dummy packet, i.e., start at bit 32,243 in the PRC and use the next sixteen bits to populate the dummy packet, and each subsequent field of sixteen bits for each subsequent dummy packet. In some embodiments of the present invention, the list may further include a start position in the PRC that identifies a time to release the dummy message, i.e., start at bit 695,377,121 in the PRC and use the next twenty four bits as a start time, and each subsequent field of twenty four bits for each subsequent start time of each subsequent dummy packet. A separate PRC for timing information may also be provided in some embodiments of the present invention. The transmitter may be configured to step through the PRC sequence so defined, thus determining a sequence of obscuring traffic packets to be generated and transmitted. PRCs are long but finite. At the end of each PRC bit sequence, the PRC can roll-over to its beginning (forming a loop rather than just a linear sequence), in effect allowing the sequence to continue. Using the PRC in this fashion may allow generation of messages that appear truly random and for transmission of these messages at truly random times. The randomness of the messages and/or times may make it difficult for a hacker to determine or predict a pattern. It will be understood that each of the components may receive a different list of start positions for data and/or times and, therefore, each component may generate different obscuring traffic at different times.

Synchronization of a transmitter and a receiver of dummy traffic can be achieved. For example, if each component receives a set of appropriate sequence-defining information, for example, a PRC identifier, message identifier and timing field scheme, and start position, for ones of the other components it will transmit obscuring traffic to, the receiving components may be instructed to identify and discard that exact obscuring traffic via the same set of appropriate sequence-defining information pertaining to the component.

Furthermore, in some embodiments of the present invention, the deceiver circuit 265 may generate obscuring traffic using a "recipe" including two or more of the generation methods discussed above in combination. For example, the first two packets including obscuring traffic may include previously transmitted true traffic, the next two packets may include data generated using a mathematical algorithm, the next two packets may include PRC-determined data and so on. This example is provided for exemplary purposes only and embodiments of the present invention should not be limited to this configuration. For example, any recipe of generating obscuring traffic may be used without departing from the teaching of the present invention.

The transmission circuit 270 may be configured to transmit the generated obscuring traffic to one or more of the plurality of components so as to obscure the real traffic from intruders of the distributed network. The receiver circuit 275 may be configured to receive the transmitted obscuring traffic at the one or more of the components in the system. It will be understood that each of the components may receive and transmit obscuring traffic. The obscuring traffic received at and transmitted by the components may be unique to the particular component. For example, each component may be associated with a unique list of messages 259.

The deceiver circuit 265 may be configured to keep track or maintain knowledge of the transmitted obscuring traffic so as to allow differentiation between the generated obscuring traffic and the real traffic in the distributed network. The deceiver circuit may keep track of the source from which the obscuring packet was sent using, for example, a source identifier, the destination to which the obscuring packet was sent using for example, a destination identifier, and a transmit time for the associated obscuring traffic. This information may be maintained at the source and destination components or at a central location available to all of the components. In other words, the system keeps track of each of the obscuring messages sent from a particular source to a particular destination so that the obscuring traffic may be discarded and the real traffic may be maintained. For example, component data 261 may be stored at a central location or at each of the components in the system. The component data 261 may include, for example, receive and transmit information associated with obscuring data to be received and/or transmitted by the particular component. In some embodiments of the present invention, the component data 261 may include a receive set including identification numbers of a particular PRC, a selected offset in the PRC and a start time. A similar transmit set may also be provided. This approach may also be used to achieve synchronization of obscuring traffic generated and received as discussed above.

In some embodiments of the present invention, update messages may be transmitted to the components. The update messages may include information that can be used to allow the components to distinguish between the generated obscuring traffic and the real traffic. For example, new receive and transmit sets may be sent to the components before the old one expires. Each component may only receive information pertinent to that particular component. Thus, if an intruder gains access to one component, the entire security plan, for example, obscuration, of the system is not available to the intruder. In further embodiments of the present invention, a first update message may be transmitted for a first time period and a second update message may be transmitted for a second time period before expiration of the first time period. Thus, the components may have access to the second update message before the time period for operation of the second update message arrives, i.e., before the time period for the first update message expires. The data handling circuit 280 may be configured to discard the obscuring traffic.

In some embodiments of the present invention, the deceiver circuit 265 may be configured to measure or consider the current threat to the distributed network environment, for example, if someone hacking into the network. The deceiver circuit 265 may be configured to increase and/or decrease an amount of generated obscuring traffic responsive to a perceived threat to the distributed network, for instance to increase the amount of generated obscuring traffic when the security threat increases. The amount of obscuring traffic may be increased and/or decreased incrementally, at a particular slope or rate of change, or may be turned on or off instantaneously. Increasing or decreasing the obscuring traffic may be applied globally to the entire distributed system (all the pertinent components) or separately to one or more of the components, such that some components increase obscuring traffic while others decrease it, or some components decrease obscuring traffic faster than others, or some components continue to generate obscuring traffic while others stop such generation, or in any other combination.

While the present invention is illustrated with reference to the deceiver circuit 265, the transmission circuit 270, the receiver circuit 275 and the data handling circuit 280 being application programs in FIG. 2, as will be appreciated by those of skill in the art, other configurations fall within the scope of the present invention. For example, rather than being application programs 254, these circuits and modules may also be incorporated into the operating system 252 or other such logical division of the system 268. Furthermore, while the deceiver circuit 265, the transmission circuit 270, the receiver circuit 275 and the data handling circuit 280 are illustrated in a single system 268, as will be appreciated by those of skill in the art, such functionality may be distributed across one or more systems. Thus, the present invention should not be construed as limited to the configuration illustrated in FIG. 2, but may be provided by other arrangements and/or divisions of functions between data processing systems. For example, although FIG. 2 is illustrated as having various circuits, one or more of these circuits may be combined without departing from the scope of the present invention.

Operations according to various embodiments of the present invention will now be further described with reference to the flow chart illustrations of FIGS. 3 and 4. Referring first to FIG. 3, methods for obscuring real traffic in a distributed network will be discussed. Operations begin at block 300 by obscuring traffic associated with ones of a plurality of components coupled to the distributed network. The obscuring traffic may be generated using one or more of many methods of randomly generating data, or generating randomly appearing data. For example, the obscuring traffic may be randomly generated/randomly appearing dummy traffic for one or more of the components. The randomly generated/randomly appearing obscuring traffic may be generated by using previously transmitted real traffic, using pseudo-random codes (PRCs), a list of messages, one or more mathematical algorithms, and/or any combination of these approaches. The generated obscuring traffic may be transmitted to one or more of the components coupled to the distributed network so as to obscure the real traffic from intruders of the distributed network (block 305).

Referring now to FIG. 4, operations begin at block 400 by obscuring traffic associated with ones of a plurality of components coupled to the distributed network. As discussed above, the obscuring traffic may be generated using one or more of many methods of randomly generating data, or generating randomly appearing data. In some embodiments of the present invention, an amount of generated obscuring traffic may be increased and/or increased responsive to a perceived threat to the distributed network.

The generated obscuring traffic may be transmitted to one or more of the components coupled to the distributed network so as to obscure the real traffic from intruders of the distributed network (block 405). Knowledge of the obscuring traffic may be maintained so as to allow differentiation between the generated obscuring traffic and the real traffic in the distributed network (block 410). This knowledge may be maintained at the particular component or at a central location available to all of the components. For example, update messages may be transmitted to the components including information that may allows the components to distinguish between the generated obscuring traffic and the real traffic. The update messages may only include information pertaining to the particular component receiving the update message. This may beneficially limit access to the entire security plan, possibly reducing the threat of a hacker defeating or exploiting the obscuration scheme. In other words, if an intruder gains access to a particular component, he may only access security information related to that component. In certain embodiments of the present invention, a first update message may be transmitted including information for a first time period and a second update message may be transmitted for a second time period before expiration of the first time period. Thus, in these embodiments, the components may have all the information they need to distinguish between generated obscuring traffic and real traffic. The transmitted obscuring traffic may be received at the one or more of the components (block 415). The received obscuring traffic may be discarded at the components (block 420).

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method for obscuring real traffic in a distributed network, comprising:
generating obscuring traffic associated with ones of a plurality of components coupled to the distributed network;
transmitting the generated obscuring traffic to the ones of the plurality of components so as to obscure the real traffic from intruders of the distributed network; and
maintaining knowledge of the obscuring traffic so as to allow differentiation between the generated obscuring traffic and the real traffic in the distributed network,
wherein maintaining knowledge comprises transmitting update messages to the ones of the plurality of components so as to allow the components to distinguish between the generated obscuring traffic and the real traffic;
wherein generating the obscuring traffic comprises generating a list of messages to be included in dummy packets;
wherein transmitting the generated obscuring traffic comprises transmitting dummy packets including messages from the list; and
wherein the update messages includes a message identifier referring to a message in the list of messages, a source identifier, a destination identifier and a transmit time for the associated dummy packet.

2. The method of claim 1, wherein transmitting update messages further comprises transmitting a first update message for a first time period and transmitting a second update message for a second time period before expiration of the first time period.

3. The method of claim 1, further comprising:
receiving the transmitted obscuring traffic at the ones of the plurality of components; and
discarding the received obscuring traffic at the ones of the plurality of components.

4. The method of claim 1, wherein generating the obscuring traffic comprises generating the dummy packets using a script or sequencing method that utilizes the message identifier, the source identifier and the transmit time.

5. The method of claim 1, wherein generating the obscuring traffic comprises generating a dummy packet including data from a previously transmitted real packet and wherein transmitting the generated obscuring traffic comprises transmitting the dummy packet including the data from the previously sent real packet.

6. The method of claim 1, wherein generating the obscuring traffic comprises generating the obscuring traffic using a mathematical algorithm.

7. The method of claim 1, further comprising increasing or decreasing an amount of generated obscuring traffic responsive to a perceived threat to the distributed network.

8. The method of claim 1, wherein generating obscuring traffic comprises generating different obscuring traffic for each of the ones of a plurality of components coupled to the distributed network.

9. A system for obscuring real traffic in a distributed network, comprising:
   a data processor;
   a deceiver circuit associated with the data processor and configured to generate obscuring traffic associated with ones of a plurality of components coupled to the distributed network; and
   a transmission circuit associated with the data processor and configured to transmit the generated obscuring traffic to the ones of the plurality of components so as to obscure the real traffic from intruders of the distributed network,
   wherein the deceiver circuit is further configured to maintain knowledge of the obscuring traffic so as to allow differentiation between the generated obscuring traffic and the real traffic in the distributed network and to maintain knowledge of the obscuring traffic by transmitting update messages to the ones of the plurality of components so as to allow the components to distinguish between the generated obscuring traffic and the real traffic,
   wherein the deceiver circuit is further configured to generate a list of messages to be included in dummy packets;
   wherein the transmission circuit is further configured to transmit dummy packets including messages from the list; and
   wherein the update messages includes a message identifier referring to a message in the list of messages, a source identifier, a destination identifier and a transmit time for the associated dummy packet.

10. The system of claim 9, wherein the deceiver circuit is further configured to transmit a first update message for a first time period and transmit a second update message for a second time period before expiration of the first time period.

11. The system of claim 9, further comprising:
   a receiver circuit configured to receive the transmitted obscuring traffic at the ones of the plurality of components; and
   a data handling circuit configured discard the received obscuring traffic at the ones of the plurality of components.

12. The system of claim 9, wherein the deceiver circuit is further configured to generate the obscuring traffic using a script or sequencing method that utilizes the message identifier, the source identifier and the transmit time.

13. The system of claim 9, wherein the deceiver circuit is further configured to generate a dummy packet including data from a previously transmitted real packet and wherein the deceiver circuit is further configured to transmit the dummy packet including the data from the previously sent real packet.

14. The system of claim 9, wherein the deceiver circuit is further configured to generate the obscuring traffic using a mathematical algorithm.

15. The system of claim 9, wherein the deceiver circuit is further configured to increase or decrease an amount of generated obscuring traffic responsive to a perceived threat to the distributed network.

16. The system of claim 9, wherein the deceiver circuit is further configured to generate different obscuring traffic for each of the ones of a plurality of components coupled to the distributed network.

17. A system for obscuring real traffic in a distributed network, comprising:
   a data processor configured to:
   generate obscuring traffic associated with ones of a plurality of components coupled to the distributed network;
   transmit the generated obscuring traffic to the ones of the plurality of components so as to obscure the real traffic from intruders of the distributed network; and
   maintain knowledge of the obscuring traffic so as to allow differentiation between the generated obscuring traffic and the real traffic in the distributed network,
   wherein the data processor is further configured to transmit update messages to the ones of the plurality of components so as to allow the components to distinguish between the generated obscuring traffic and the real traffic;
   generate a list of messages to be included in dummy packets; and
   transmit dummy packets including messages from the list; and
   wherein the update messages includes a message identifier referring to a message in the list of messages, a source identifier, a destination identifier and a transmit time for the associated dummy packet.

18. The system of claim 17, wherein the data processor is further configured to:
   receive the transmitted obscuring traffic at the ones of the plurality of components; and
   discard the received obscuring traffic at the ones of the plurality of components.

19. An article of manufacture for obscuring real traffic in a distributed network, the article of manufacture comprising:
   a computer readable medium having computer readable program code embodied therein, the computer readable program code comprising:
   computer readable program code configured to generate obscuring traffic associated with ones of a plurality of components coupled to the distributed network;
   computer readable program code configured to transmit the generated obscuring traffic to the ones of the plurality of components so as to obscure the real traffic from intruders of the distributed network;
   computer readable program code configured to maintain knowledge of the obscuring traffic so as to allow differentiation between the generated obscuring traffic and the real traffic in the distributed network;
   computer readable program code configured to transmit update messages to the ones of the plurality of components so as to allow the components to distinguish between the generated obscuring traffic and the real traffic;
   computer readable program code configured to generate a list of messages to be included in dummy packets; and computer readable program code configured to transmit dummy packets including messages from the list, wherein the update messages include a message identifier referring to a message in the list of messages, a source identifier, a destination identifier.

20. The article of manufacture of claim 19, wherein the computer readable program code configured to transmit update messages further comprises computer readable program code configured to transmit a first update message for a first time period and transmit a second update message for a second time period before expiration of the first time period.

21. The article of manufacture of claim 19, further comprising:

computer readable program code configured to receive the transmitted obscuring traffic at the ones of the plurality of components; and computer readable program code configured to discard the received obscuring traffic at the ones of the plurality of components.

22. The article of manufacture of claim 19, wherein the computer readable program code configured to generate comprises computer readable program code configured to generate the obscuring traffic using a script or sequencing method that utilizes the message identifier, the source identifier and the transmit time.

23. The article of manufacture of claim 19, further comprising:

computer readable program code configured to generate a dummy packet including data from a previously transmitted real packet; and computer readable program code configured to transmit the dummy packet including the data from the previously sent real packet.

24. The article of manufacture of claim 19, further comprising computer readable program code configured to generate the obscuring traffic using a mathematical algorithm.

25. The article of manufacture of claim 19, further comprising computer readable program code configured to increase or decrease an amount of generated obscuring traffic responsive to a perceived threat to the distributed network.

26. The article of manufacture of claim 19, further comprising computer readable program code configured to generate different obscuring traffic for each of the ones of a plurality of components coupled to the distributed network.

* * * * *